Patented Sept. 17, 1935

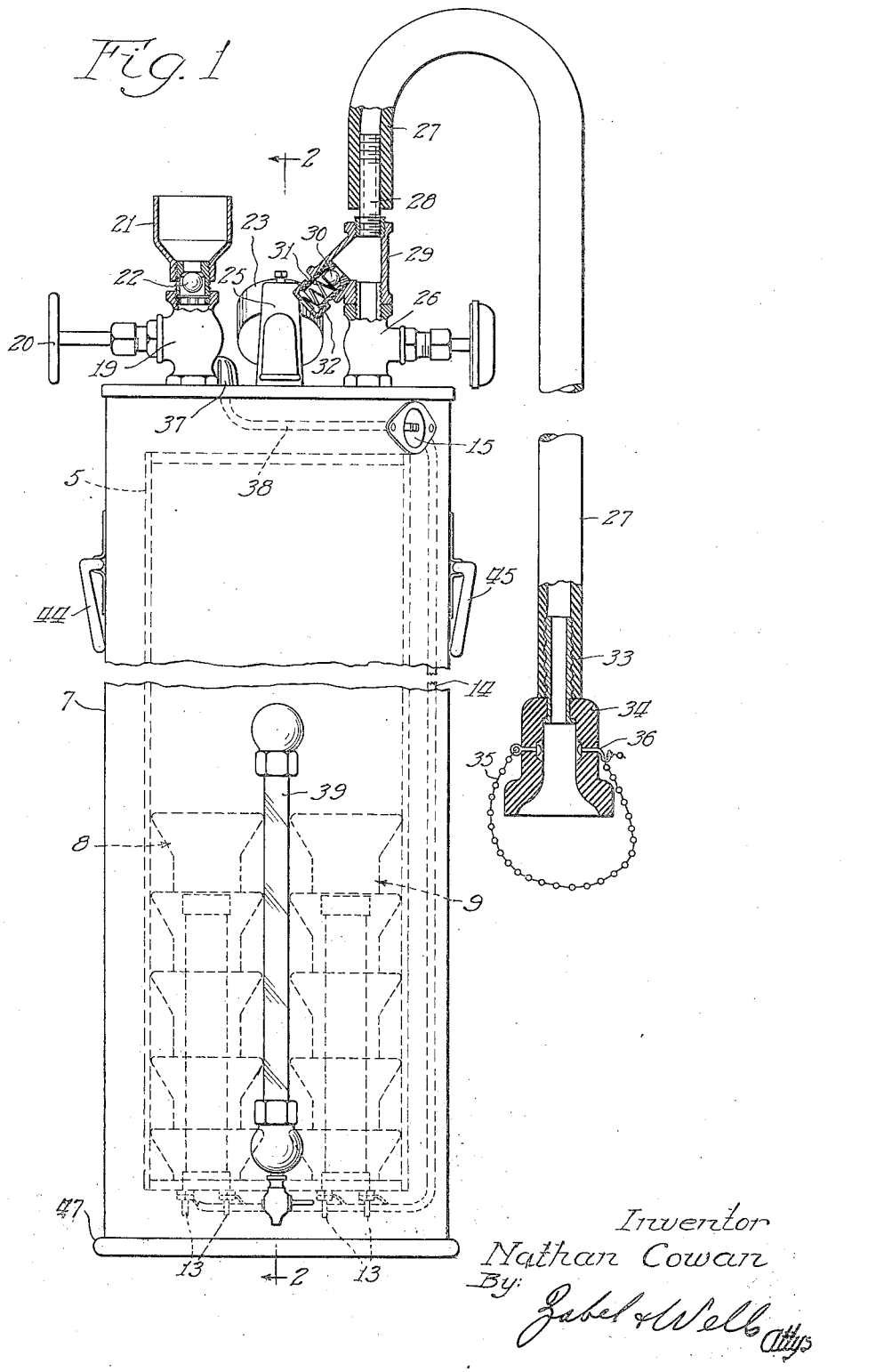

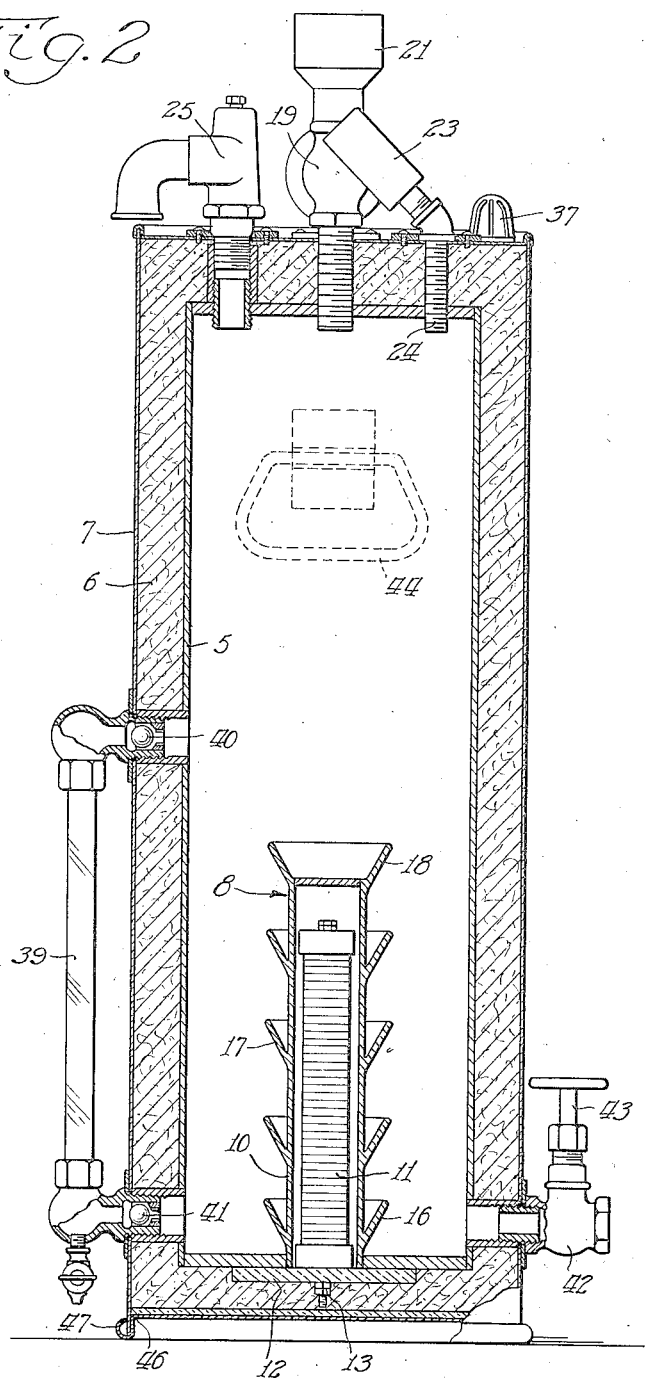

2,014,836

UNITED STATES PATENT OFFICE 2,014,836

PORTABLE DEVICE FOR PRODUCING AND DELIVERING STEAM AND HOT WATER UNDER PRESSURE

Nathan Cowan, Chicago, Ill., assignor to Commercial Products Company, Chicago, Ill., a corporation of Illinois Application September 16, 1933, Serial No. 689,782

4 Claims. (Cl. 219—38)

My invention relates to a portable device for producing and delivering steam and hot water under pressure. The principal uses of the device are in the cleaning of faucets, coils, and drains where there is not available a supply of steam under pressure.

It is the principal purpose of this invention to provide a device of this character which may be readily moved from place to place and applied to the device to be cleaned readily without danger to the operator from excessive pressure or other difficulties in connection with the use of the steam.

I will describe the preferred form of my invention by reference to the accompanying drawings. It is to be understood, however, that the description and drawings are illustrative only and are not to be taken as limiting the invention except in so far as it is limited by the claims.

In the drawings—

Fig. 1 is an elevation of the device with certain parts being shown in section; and Fig. 2 is a section substantially on the line 2—2 of Fig. 1.

Referring now in detail to the drawings, I show at 5 a casing of metal which is adapted to serve as a water and steam tank and for this reason is constructed of rather strong effect material. This casing is jacketed with a layer of insulation as shown at 6 and an outer retaining casing 7 for holding the insulating material in place. The insulation 6 may be of any suitable material such, for example, as asbestos fiber.

Within the casing 5 I provide a pair of heating units 8 and 9, each of which consists of a tubular container 10 secured in the bottom of the casing 5 and within the container 10 a heating element 11, preferably in the form of a heating coil, which is adapted to be connected to the terminal board 12 and the terminal member 13 to a source of current which is brought in by means of the wires indicated at 14 leading from the plug-in socket at 15. The wires 14 are, of course, embedded in the insulating material 6 and are connected to the terminals 13 of both heating units 8 and 9 as shown in dotted lines in Fig. 1.

The container 10, it will be noted, has the inverted cone shaped skirts such as 16 and 17 extending from adjacent the bottom thereof at spaced intervals to the top. The top cone shaped member 18 forms in effect a shallow cup on the upper end of the container. At the top of the casing 5 I provide an inlet valve at 19 having the handle 20 and having a filling funnel 21 mounted thereon through which water may be supplied to the interior of the casing. A check valve is provided at 22 to prevent the escape of steam or water upwardly through the funnel 21 in case the valve 19 is accidentally left open.

I provide the device with a pressure gauge 23 connected by means of the pipe 24 to the interior of the casing 5. I also provide a high pressure relief valve 25 also connected to the interior of the casing 5 in order to prevent excessive pressure within the casing 5. The steam gauge 23 and the release valve 25 may be of standard commercial structure for the details thereof are not important to the present invention. For delivering the steam generated within the casing 5 I provide the outlet valve 26 which leads to a flexible steam hose 27 capable of withstanding high pressure through a nipple 28 and a casing 29. The casing 29 also has a relief valve indicated at 30 and an adjusting spring 31 which can be tightened or loosened by means of the cap 32 to govern the maximum pressure that may be applied through the steam hose 27.

The advantage of this device it is believed can be readily apparent since it is obvious that certain of the things to be cleaned may not be able to withstand the normal steam pressure within the casing 5 and by adjusting the valve 30 a reduced pressure of any desired maximum value can be obtained without danger of injuring the article being cleaned.

On the free end of the hose 27 a nipple 33 connects the hose to a connecting member 34 of rubber which is adapted to be forced over the ordinary faucet outlet or seated over a drain opening or inserted within the drain opening, whichever is most convenient. This connecting head 34 has a chain 35 and a hook 36 thereon so that when it is secured over a faucet, for example, it may be fastened by the chain 35 so as to make it unnecessary to hold it in place manually. The device has a pilot lamp at 37 connected by means of the wire 38 to the plug receptacle 15 so that when the heaters are energized this light will also be energized.

The water gauge tube 39 is connected through the two check valves 40 and 41 with the interior of the casing 5 so as to indicate the water level therein, the check valves 40 and 41 serving to prevent the escape of water or steam from casing 5 in case the glass tube 39 becomes broken.

I also provide at the bottom of the casing 5 an outlet valve 42 operated by the handle 43, this valve being used to supply hot water in case hot water is needed instead of steam. This is done by merely removing the hose from the connection to valve 26 and connecting it to the valve 42. It is evident that upon opening valve 42, then the steam pressure within the casing 5 will force the hot water in the lower portion thereof out through the valve 42.

One feature of importance in this device is the provision of the cone shaped skirts or fins 16, 17 upon the containers 10. One desirable feature in a device of this character is its ability to quickly produce steam or hot water. These fins or aprons gauge the water and quickly transfer their heat to the surrounding water. Also those above the water level are practically always filled with water in filling the casing and the water within the pockets formed by the aprons and within the cup 18 at the top will be immediately formed into steam long before the body of the water can be caused to produce much steam. This results in a considerable saving in time in placing a device in operation.

I have shown the device as provided with the handles at 44 and 45 for carrying it around and the base is finished by a plate such as 46 curled at its rim as indicated at 47 to provide a good support for the device.

Having thus described my invention, what I claim as new and desire to secure by Letters Patent is:

1. A device of the character described comprising a casing having heating means therein, a water inlet for filling said casing, a steam outlet at the top of said casing, a flexible conduit for conducting steam from said outlet to point of use, said casing having an insulating cover thereon, said heating means including an electrical heating unit, a metal tube projecting into said casing in which said heating unit is located, and said tube having on the exterior thereof cone shaped fins projecting outwardly and upwardly from the tube.

2. A device of the character described comprising a casing having heating means therein, a water inlet for filling said casing, said inlet having a check valve therein preventing steam flow out through it, a steam outlet at the top of said casing, a flexible conduit for conducting steam from said outlet to point of use, said casing having an insulating cover thereon, said heating means including an electrical heating unit, a metal tube projecting into said casing in which said heating unit is located, and said tube having on the exterior thereof cone shaped fins projecting outwardly and upwardly from the tube.

3. A device of the character described comprising a casing having heating means therein, a water inlet for filling said casing, a steam outlet at the top of said casing, a flexible conduit for conducting steam from said outlet to point of use, said casing having an insulating cover thereon, said heating means including an electrical heating unit, a metal tube projecting into said casing in which said heating unit is located and said tube having on the exterior thereof cone-shaped fins projecting outwardly and upwardly from the tube, said flexible conduit having an enlarged head on the free end thereof provided with a flared opening to receive a faucet or the like.

4. A device of the character described comprising a casing having heating means therein, a water inlet for filling said casing, a steam outlet at the top of said casing, a flexible conduit for conducting steam from said outlet to point of use, and an adjustable pressure relief valve interposed between said outlet and said conduit for controlling the maximum pressure transmitted through said conduit, said casing having an insulating cover thereon, said heating means including an electrical heating unit, a metal tube projecting into said casing in which said heating unit is located, and said tube having on the exterior thereof cone-shaped fins projecting outwardly and upwardly from the tube.

NATHAN COWAN.